Feb. 9, 1926. 1,572,263
M. T. ASH
OBJECT DISPENSING MACHINE
Filed March 7, 1922 2 Sheets-Sheet 2
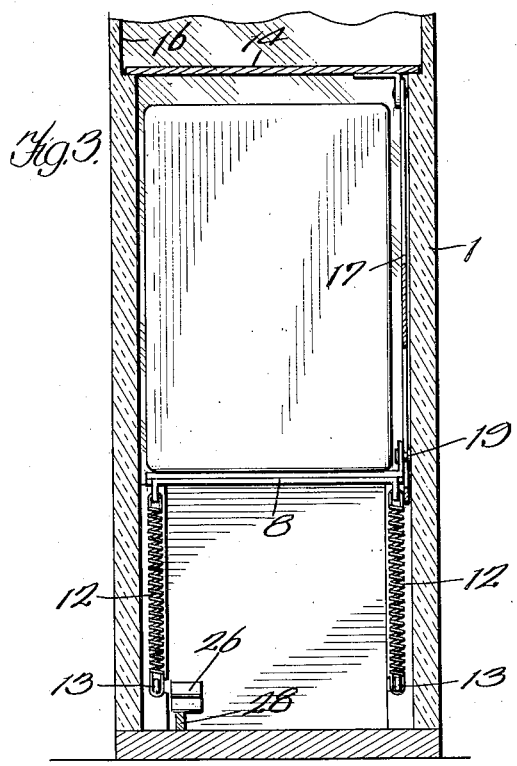
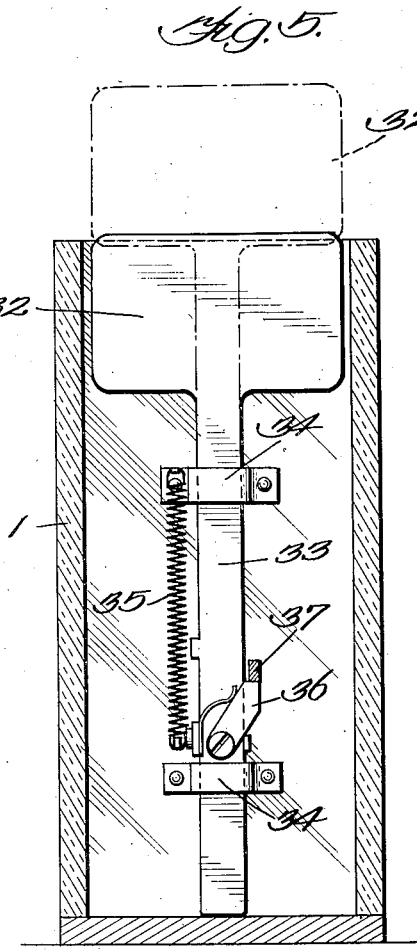
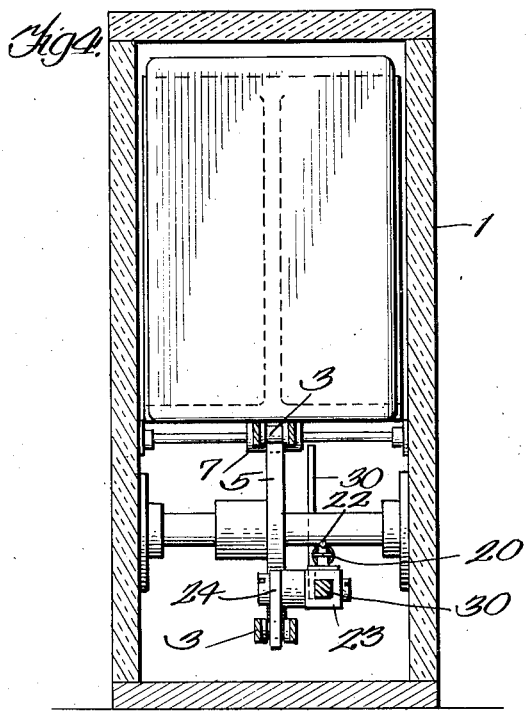
Inventor:
Manselius T. Ash Patented Feb. 9, 1926.

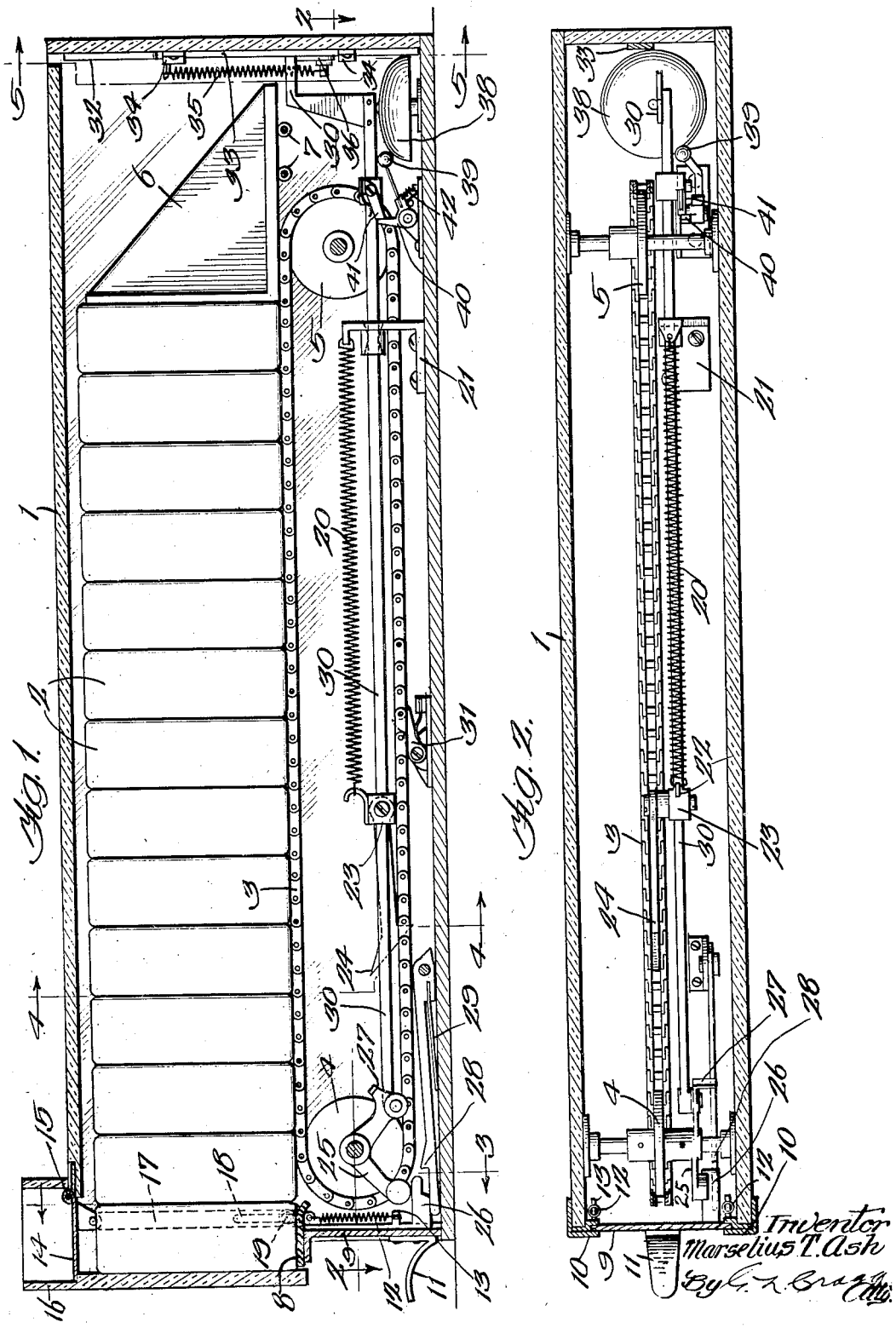

1,572,263

UNITED STATES PATENT OFFICE.

MARSELIUS T. ASH, OF CHICAGO, ILLINOIS.

OBJECT-DISPENSING MACHINE.

Application filed March 7, 1922. Serial No. 541,728.

*To all whom it may concern:*

Be it known that I, MARSELIUS T. ASH, citizen of the United States, residing at Chicago, in the county of Cook and State of Illinois, have invented a certain new and useful Improvement in Object-Dispensing Machines, of which the following is a full, clear, concise, and exact description.

My invention relates to object dispensing machines and resides in mechanism for advancing objects to place fresh objects in position to be ejected, this mechanism being controlled by the object ejecting mechanism.

In accordance with one characteristic of the invention the ejecting mechanism serves to store power in the advancing mechanism.

In accordance with another characteristic of the invention the advancing mechanism is made operative when the ejecting mechanism is restored to non-functioning position, this feature of the invention being employed either with or without the means whereby the ejecting mechanism stores power in the advancing mechanism.
My invention is of particular service when employed in conjunction with a dispensing machine that includes a container for a row of objects that are to be dispensed. The invention, in this aspect, is inclusive of an ejecting mechanism movable transversely of the row of objects for dispensing the objects and a power device for advancing the row of objects bodily to refill the space from which the object has been displaced.

The invention, in all of its aspects, will be fully explained in connection with the accompanying drawings in which Fig. 1 is a longitudinal sectional view of a dispensing machine constructed in accordance with the preferred embodiment of the invention; and Figs. 2, 3, 4 and 5 are sectional views taken respectively on lines 2—2, 3—3, 4—4, and 5—5 of Fig. 1.
Like parts are indicated by similar characters of reference throughout the different figures.

The dispensing machine illustrated includes a horizontally disposed oblong container 1 whose side and top walls are preferably formed of glass to reveal the contents of the container, particularly the packages or other objects 2 that are to be dispensed therefrom as required. These objects are disposed upright in a horizontal row and are supported upon the upper stretch of an endless horizontal belt or chain 3 that passes over sheaves 4 and 5. The chain is driven a step in a counterclockwise direction each time it is to advance the packages and supports a weight 6 that is in pushing relation to the packages and constitutes the preferred means whereby the chain is brought into pushing relation with said packages. Rollers 7 take part in supporting the weight when in its rearmost position, to prevent it from tilting backward. The object which is at the left hand or front end of the row illustrated in Fig. 1 is next in order to be ejected, this object having been pushed by the chain, in a manner to be set forth, onto the horizontal supporting plate 8 of my improved ejecting mechanism that is also inclusive of an upright slide 9 moving in upright guideways 10 carried by the portion of the container 1 that underlies the packages. The ejecting mechanism also includes a finger hold 11 carried by and projecting forwardly from the slide 9. Upright springs 12 serve to restore the ejector to its normal non-ejecting or non-functioning position, these springs being secured at their upper ends to the supporting plate 8 and at their lower ends to anchorages 13 that are carried by and within the container.

When the object is to be ejected the index finger may be placed under the finger hold 11 to raise the ejector against the force of the springs 12. The front package, in being moved outwardly, swings the lid 14 upon its hinge 15 to clear the way for the package which finds egress through a continuation 16 of the container 1, this continuation being open at its top and of a size freely to permit the passage of the object under removal. The lid 14 is at the lower end of the container 16 to be inaccessible from the exterior. In order that the lid may be given closing movement upon the restoration of the ejecting mechanism to non-functioning or non-ejecting position I connect it with the ejecting mechanism by means of a link 17 that has an upright slot 18 therein which receives the shank of a double headed pin 19 carried upon the plate 8. This slot is sufficiently long to permit of continued upward movement of the ejector after the lid 14 has been opened, the double headed pin ultimately reaching the neighborhood of the upper end of the slot 18 in the discharging movement. In the restoring movement of the ejector the double headed pin engages the bottom end of the slot 18 to close the lid.

When the package has been ejected the chain 3 is moved sufficiently to advance the entire remainder of the row to position a fresh package within the evacuated space.

The chain is moved in a counter-clockwise direction by means of a spring 20 anchored at its rear end upon the bracket 21 carried upon the bottom of the container and connected at its forward end with a hook 22 that is mounted upon a block 23. The spring 20 performs its function through a pawl 24, pivoted upon the block 23, and engages the lower stretch of the chain. When the apparatus is idle the spring 20 is in its contracted position, having previously performed its function. When the ejector is operated the spring is stretched to store power therein to be employed when a package has been ejected. The means for storing power in the spring is desirably inclusive of a bell crank 25 that is in fixed relation with the chain driving sheave 4 and a lug 26 upon the slide 9 that engages the front arm of the bell crank when the ejector is moved upwardly transversely of the row of objects. If the ejector is moved forwardly in an object discharging direction the bell crank is turned sufficiently to bring the lug 27 upon the other arm of the bell crank into engagement with a detent 28 which is pressed upwardly by a spring 29 in position to be engaged by the lug 27 when the lug 26 is at the upper limit of its travel. The bell crank, having been turned clockwise upon the full object discharging movement of the ejector, is held in this position until the ejector has been restored to its normal position in which the lock 26 will depress the detent 28 against the force of the spring 29 to release the lug 27 to permit the reverse movement of the bell crank. A horizontal rod 30 is connected at its forward end to the rear arm of the bell crank and carries the aforesaid block 23 upon which the pawl 24 is pivoted and with which the forward end of the spring 20 is connected, as hitherto stated. When the ejector has been given its full object discharging movement the bell crank is turned sufficiently in a clockwise direction to pull the front end of the spring 20 forwardly through the intermediation of the rod 30. At the same time, the pawl 24 is moved forward a corresponding distance to have engagement with a part of the chain in front of the chain portion where the pawl 24 was at rest. The lug 27, remaining in engagement with the detent 28 until the ejector has been restored to normal position, as hitherto stated, the spring 20 is held stretched by the rod 30 until the ejector has completed its circle of movements and is brought to its lowermost or non-ejecting or non-functioning position. When the ejector has thus been restored the detent 28 is depressed to free the lug 27 whereupon the spring 20 is free to contact to turn the chain in a counter-clockwise direction to refill the space vacated by the newly ejected package. This movement of the chain may be in excess of that required properly to shift the packages, the upper stretch of the chain sliding beneath the packages a short distance after the vacated space has been supplied. An upwardly spring pressed pawl 31 prevents reverse travel of the chain and permits the normal movement thereof.

The dispensing machine herein illustrated is adapted for use by the public and is therefore desirably provided with signaling means which is operated each time a package is ejected. This signaling means desirably includes a target 32 having a stem 33 vertically movable in guides 34 and normally depressed to a lowermost or concealed position against the force of a spring 35. This target is held in this position by means of a detent 36 pivoted upon the stem 33 and which engages the under side of a stop 37 carried upon the rod 30. Whenever the rod 30 is moved forwardly the stop 37 is moved out of the path of the detent 36 to permit the spring 35 to raise the target. When the apparatus is in normal condition with the rod 30 in the rearmost position the proprietor may depress the target to reengage the pawl 36 below the stop 37.

In addition to the visual signal 32 I also provide an audible signal that is inclusive of a gong 38 and a clapper 39 for sounding it. This clapper is upon a bell crank 40 that is engaged by a trip lever 41 whenever the rod 30 is moved forwardly. After the trip lever has escaped the bell crank lever the spring 42 serves to apply the clapper to the gong.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a dispensing machine, the combination with a container; of an endless belt in said container and having an upper stretch which serves to support a row of objects that are to be dispensed; an ejector at the discharge end of the belt and positioned to receive objects carried thereto by the belt, said ejector being movable transversely of the belt toward an opening which is formed in the top of the container in line with said ejector; a pawl in actuating relation with the belt and serving to move the belt in a direction to move the objects toward the ejector; a connection between the pawl and ejector serving to move the pawl in an escaping direction when the ejector is operated to eject an object; and a spring connected with the pawl to oppose the escaping movement of the pawl, and, when released, to operate the pawl to move the belt.

2. In a dispensing machine, the combination with a container; of an endless belt in said container and having an upper stretch which serves to support a row of objects that are to be dispensed; an ejector at the discharge end of the belt and positioned to receive objects carried thereto by the belt, said ejector being movable transversely of the belt toward an opening which is formed in the top of the container in line with said ejector; a pawl in actuating relation with the belt and serving to move the belt in a direction to move the objects toward the ejector; a bell crank operable by the ejector when in ejecting movement and connected with the pawl which is moved in an escaping direction when the bell crank is operated on the ejecting movement of the ejector; and a spring connected with the pawl to oppose the escaping movement of the pawl and, when released, to operate the pawl to move the belt.

In witness whereof, I hereunto subscribe my name this 24th day of February A. D., 1922.

MARSELIUS T. ASH.